(12) United States Patent
Ribeiro et al.

(10) Patent No.: US 12,515,436 B2
(45) Date of Patent: Jan. 6, 2026

(54) HONEYCOMB CORE STABILIZATION FOR COMPOSITE PARTS

(71) Applicant: EMBRAER S.A., São José dos Campos (BR)

(72) Inventors: Devanir Hamilton Ribeiro, São José dos Campos (BR); Daniela Martins Falsetti, São José dos Campos (BR)

(73) Assignee: EMBRAER S.A., São José Dos Campos Sp (BR)

( * ) Notice: Subject to any disclaimer, the term of this patent is extended or adjusted under 35 U.S.C. 154(b) by 171 days.

(21) Appl. No.: 18/310,245

(22) Filed: May 1, 2023

(65) Prior Publication Data

US 2024/0367407 A1 Nov. 7, 2024

(51) Int. Cl.
*B29C 70/44* (2006.01)
*B29C 65/00* (2006.01)
(Continued)

(52) U.S. Cl.
CPC .......... *B32B 3/04* (2013.01); *B29C 66/72525* (2013.01); *B29C 70/44* (2013.01);
(Continued)

(58) Field of Classification Search
CPC .............. B29C 66/725; B29C 66/7252; B29C 66/72525; B29C 66/7254; B29C 70/44; B29D 24/005; B29D 24/007; B29D 99/0021; B29D 99/0089; B29L 2031/608; B32B 3/04; B32B 3/12; B32B 5/02; B32B 5/24; B32B 5/26; B32B 7/12; B32B 27/06; B32B 27/08; B32B 27/10; B32B 27/12; B32B 27/38; B32B 29/02; B32B 37/06; B32B 37/1009; B32B 37/1018; B32B 37/146; B32B 2038/0076; B32B 2260/021; B32B 2260/023; B32B 2260/028; B32B 2260/046; B32B 2262/106; B32B 2305/024; B32B 2309/02; B32B 2309/12; B32B 2363/00; Y10T 428/236; Y10T 428/24149; Y10T 428/24165

See application file for complete search history.

(56) References Cited

U.S. PATENT DOCUMENTS 3,658,974 A * 4/1972 Low .................. B64G 1/58
428/116
4,598,007 A 7/1986 Kourtides et al.
(Continued)

*Primary Examiner* — Michael A Tolin
(74) *Attorney, Agent, or Firm* — NIXON & VANDERHYE P.C.

(57) ABSTRACT

Processes for fabricating a partially stabilized honeycomb core is disclosed where a stabilizing layer of an adhesive film is aligned with and adhered to only one exterior surface of a honeycomb sheet. The opposed exterior surface thereby remains uncovered. A preform of the partially stabilized honeycomb core may be subjected to ambient atmospheric pressure cure conditions at an elevated temperature sufficient to adhere the stabilizing layer to the one exterior surface of the honeycomb sheet and thereby provide a partially stabilized honeycomb core that is partially stabilized against compressive forces exerted in widthwise and lengthwise directions thereof yet allows bending of the partially stabilized honeycomb core about axes in the widthwise and lengthwise directions.

28 Claims, 4 Drawing Sheets

FIG. 2A

(51) Int. Cl.
*B32B 3/04* (2006.01)
*B32B 3/12* (2006.01)
*B32B 5/02* (2006.01)
*B32B 5/26* (2006.01)
*B32B 29/02* (2006.01)
*B32B 37/06* (2006.01)
*B32B 37/10* (2006.01)
*B32B 37/14* (2006.01)
*B32B 27/10* (2006.01)
*B32B 27/38* (2006.01)

(52) U.S. Cl.
CPC .................. *B32B 3/12* (2013.01); *B32B 5/02* (2013.01); *B32B 5/26* (2013.01); *B32B 29/02* (2013.01); *B32B 37/06* (2013.01); *B32B 37/1018* (2013.01); *B32B 37/146* (2013.01); *B32B 27/10* (2013.01); *B32B 27/38* (2013.01); *B32B 2260/023* (2013.01); *B32B 2260/028* (2013.01); *B32B 2260/046* (2013.01); *B32B 2262/106* (2013.01); *B32B 2305/024* (2013.01); *B32B 2309/02* (2013.01); *B32B 2309/12* (2013.01); *B32B 2313/04* (2013.01); *B32B 2317/12* (2013.01); *B32B 2363/00* (2013.01)

(56) References Cited

U.S. PATENT DOCUMENTS

| | | | |
|---|---|---|---|
| 4,680,216 A | | 7/1987 | Jacaruso |
| 5,119,535 A | * | 6/1992 | Gnagy .................... B29C 35/04 |
| | | | 72/364 |
| 5,354,195 A | * | 10/1994 | Dublinski ........... B29C 43/3642 |
| | | | 428/116 |
| 8,926,786 B1 | | 1/2015 | Rapp et al. |
| 2009/0155524 A1 | * | 6/2009 | Rapp ......................... B32B 3/12 |
| | | | 428/116 |
| 2014/0224408 A1 | * | 8/2014 | Kuntz .................... B32B 37/04 |
| | | | 156/87 |
| 2015/0151524 A1 | | 6/2015 | Matsura et al. |

* cited by examiner

HONEYCOMB CORE STABILIZATION FOR COMPOSITE PARTS

FIELD

The embodiments disclosed herein relate generally to processes for fabricating honeycomb core composite laminate structures. In a preferred aspect, the invention is embodied in processes whereby a honeycomb core preform is partially stabilized by a film applied to one surface of the honeycomb core and thereafter subjecting the preform to high temperature ambient atmospheric cure conditions such that the resulting partially stabilized preform (post cure) may then be laid up with a final laminate layer and thereafter subjected to high temperature and high pressure autoclave curing.

BACKGROUND

Aircraft manufacturers continuously attempt to improve aircraft performance by reducing both weight and manufacturing costs while maintaining or improving structural strength. One well-known method for increasing aircraft performance is to reduce airframe weight through the use of state-of-the-art materials, such as composites, having relatively high strength-to-weight and stiffness-to-weight ratios. Composite materials are generally described as being materials that include reinforcing fibers, such as graphite fibers, embedded in a polymeric matrix, such as an epoxy resin. Such materials will hereinafter be referenced as "fiber-reinforced composite" materials. Fiber-reinforced composite materials are usually supplied as fibrous sheets pre-impregnated with a curable or partially cured resin. The so-called "prepreg sheets" may then be laid up in laminated plies and cured to form rigid panel structures.

The use of honeycomb core structures in composite materials has many benefits including outstanding stiffness and strength at relatively low weight. The upper and lower skins are usually made of fiber-reinforced (e.g., carbon, aramid or glass fibers) resin impregnated composite laminates that are separated and bonded to a thick lightweight honeycomb core. The honeycomb core may thus be provided so as to increase the thickness of the composite panel to obtain higher panel stiffness properties with minimal weight gain. The core-to-skin adhesive joins the sandwich components and allows them to act as a single unitary structure exhibiting high torsional and bending rigidity.

Current manufacturing methods for composite sandwich panels include a vacuum bag processing technique. According to this process the prepreg sheets are laid-up on a rigid mold with a honeycomb core disposed between such layers. The preform structure is then enclosed by a vacuum bag to allow a vacuum to be drawn. The consolidation of the preform structure is thereby obtained using the vacuum bag and cured in an autoclave for additional pressure.

When the laminate is cored with a honeycomb structure for autoclave curing, the core will be chamfered along its edges in order to reduce pressure effects on the edge of the core. Nonetheless, depending on final geometry of the core, its thickness, density and possibly also the laminate around it may lead to core crush during the cure cycle. Core crush may not be acceptable since it in turn degrades the mechanical properties of the core. Therefore, those in the composite material manufacturing industry will typically use certain process interventions to prevent core crush by stabilizing the honeycomb core.

A proposal has also been disclosed in U.S. Pat. No. 4,680,216 (the entire content of which is expressly incorporated by reference herein), whereby honeycomb cores may be stabilized with reinforced epoxy resin-impregnated carbon fabric and adhesive film in order to prevent core crushing during high pressure curing.

US Patent Application Publication 2015/0151524 (the entire content of which is expressly incorporated by reference herein) describes processes for stabilizing a honeycomb core composite laminate structure by enveloping a honeycomb core provided with side chamfers with a prepreg tape layer formed of a resin-impregnated fiber-reinforced matrix so that the tape layer completely surrounds all sides of the honeycomb core, including the side edge chamfers as well as the upper and lower surfaces thereof. The resulting honeycomb core preform may then be subjected to ambient pressure cure at elevated temperatures sufficient to cure the prepreg tape layer and thereby stabilize the preform.

Another prior proposal is to cure the skins of the composite structure separately and then subsequently bond such precured skins to the honeycomb core. However, this technique presents various fabrication issues, including the relatively difficult necessity to lay and align the precured skins properly on the honeycomb core when complex structural shapes are presented.

Other techniques to prevent core crush can be used but are less common in the industry. For example, changing the honeycomb type (on geometry and density) would prevent crush for some layup configurations but would certainly increase the weight. Using tie down (a dry fiber glass strip on the edge of laminate) will help most cases of core crush but suffers from the problems of creating carbon prepreg excess and additional hours of lamination and machining by personnel.

It would therefore be desirable if a honeycomb structure could be stabilized sufficiently to allow flexibility and thereby permit the core to be bent and curved about axes defined by the width (W) and/or length (L) dimensions of the core yet prevent core compressions in such W and/or L dimensions. Such a flexible, yet stabilized, honeycomb core would therefore be quite useful when preparing curved pressure-cured fiber-reinforced composite parts. It is towards fulfilling such needs that the embodiments disclosed herein are directed.

SUMMARY

In general the embodiments disclosed herein are directed toward processes for fabricating a partially stabilized honeycomb core by aligning and adhering a stabilizing layer of an adhesive film to only one exterior surface of a honeycomb sheet. A preform of the partially stabilized honeycomb core may be subjected to ambient atmospheric pressure cure conditions at an elevated temperature sufficient to adhere the stabilizing layer to the one exterior surface of the honeycomb sheet and thereby provide a partially stabilized honeycomb core that is partially stabilized against compressive forces exerted in widthwise and lengthwise directions thereof yet allows bending of the partially stabilized honeycomb core about axes in the widthwise and lengthwise directions.

A plurality of resin-impregnated fiber-reinforced plies (prepregs) may then be laid up on the partially stabilized honeycomb structure so as to envelope all exterior surfaces thereof and thereby form a final product preform. The final product preform may then be subjected to high temperature and high pressure autoclave curing conditions sufficient to cure the plurality of resin-impregnated fiber-reinforced plies and provide a cured honeycomb core composite laminate structure (i.e., a composite laminate structure having a honeycomb core).

The side edges of the partially stabilized honeycomb core may be chamfered before the resin-impregnated fiber-reinforced plies are laid up. For example, the side edges of the partially stabilized honeycomb core may be chamfered to achieve chamfer angles of at least about 15°, 20°, 25° or 30° up to about 85°. Further, the partially stabilized honeycomb core may be curved about axes in the widthwise and/or lengthwise directions of the honeycomb sheet during the lay-up of the resin-impregnated fiber-reinforced plies so as to form a laminate structure that is in turn curved in the same manner.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
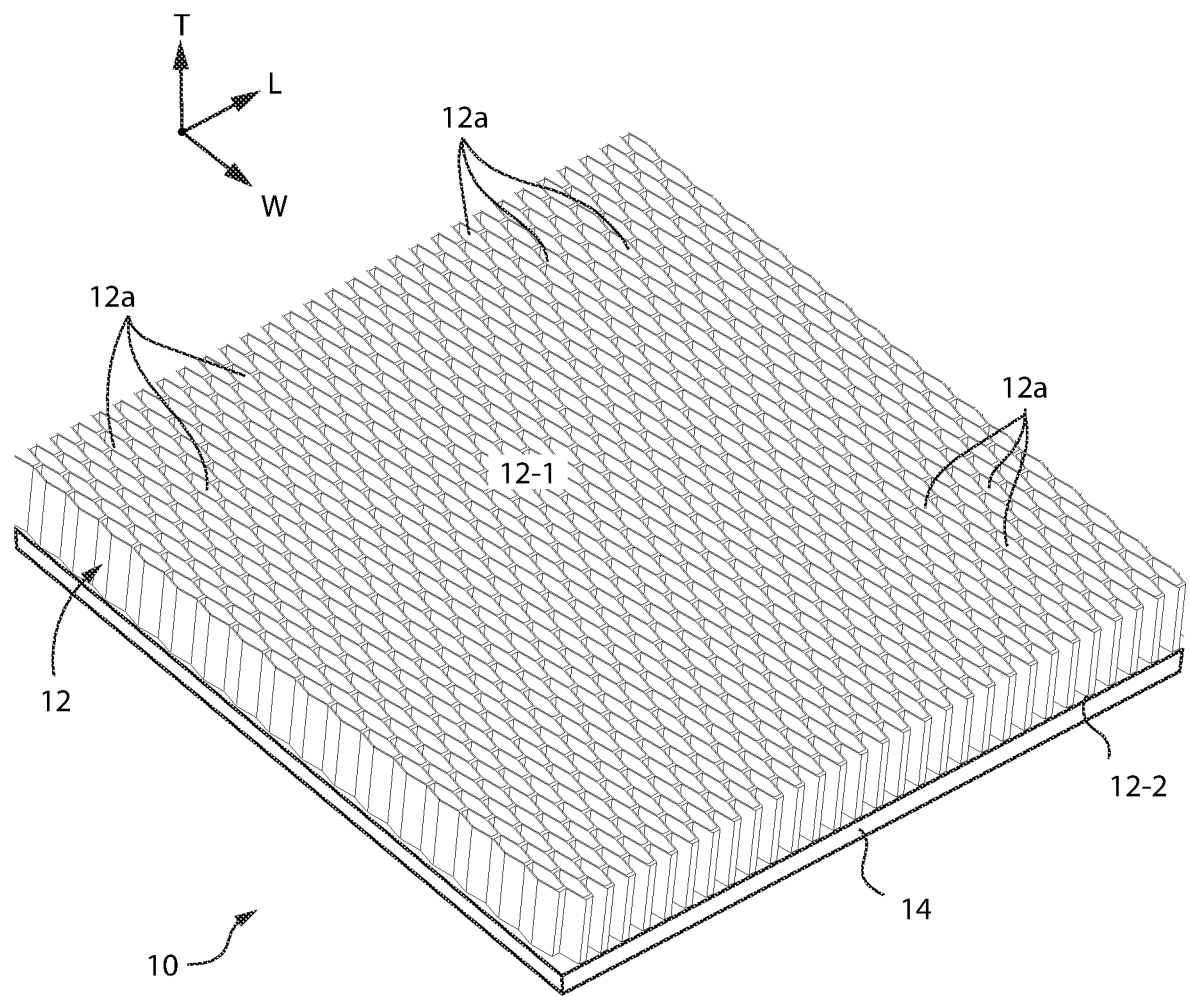
FIG. 1 is a perspective view showing a partially stabilized honeycomb core in accordance with an embodiment of the invention.
Figure 2:
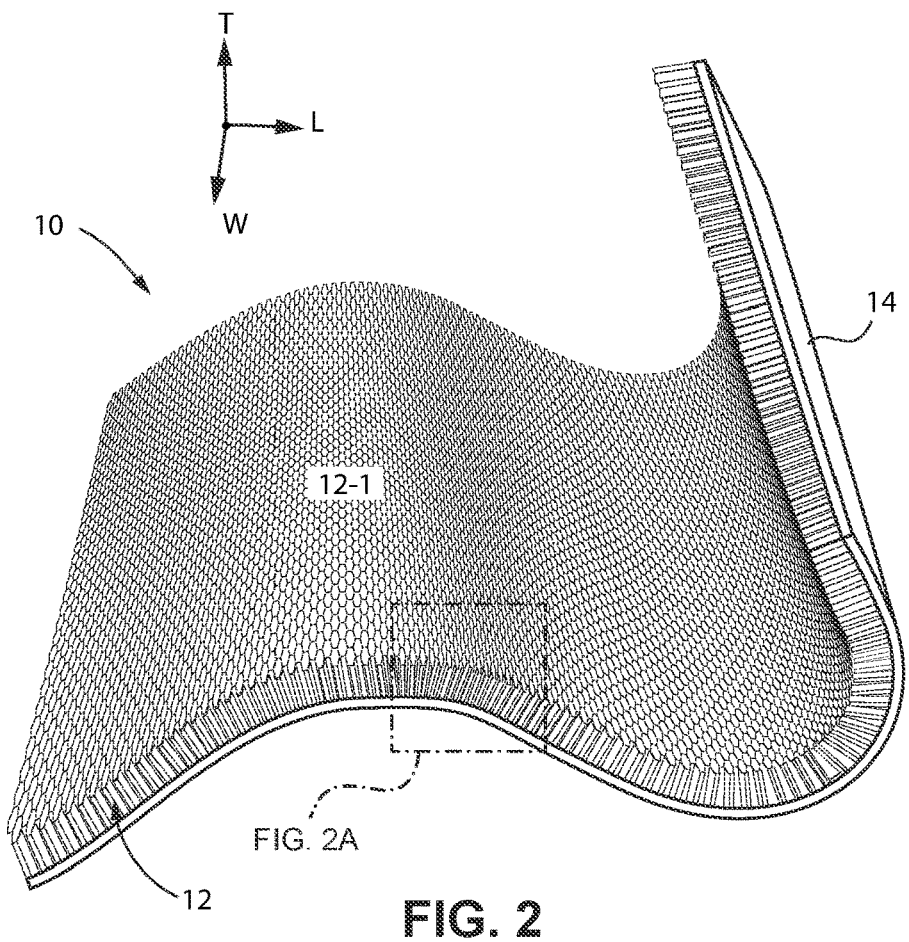
FIG. 2 is a perspective view of the partially stabilized honeycomb core depicted in FIG. 1 that is curved about axes in the widthwise direction W and/or the lengthwise direction L thereof.
Figure 2A:
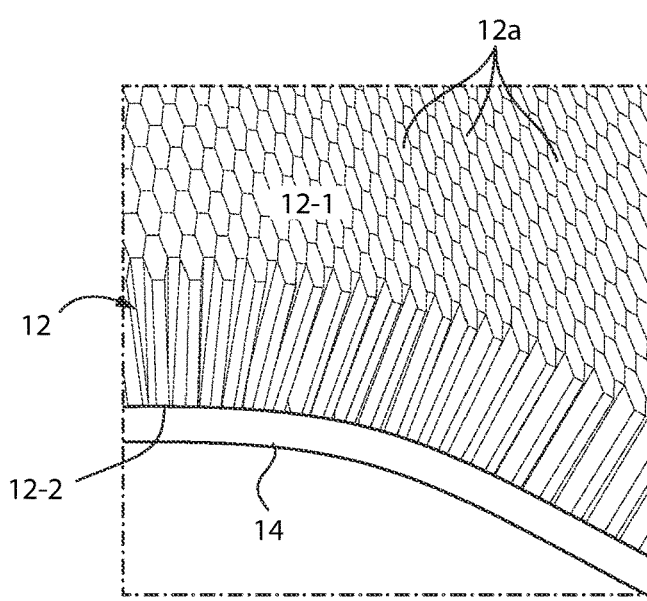
FIG. 2A is an enlarged view of a portion of the partially stabilized honeycomb core as shown in FIG. 1.

Accompanying FIGS. 1, 2 and 2A schematically show a partially stabilized honeycomb core 10 in accordance with an embodiment of the invention. As shown, the partially stabilized honeycomb core 10 includes a honeycomb sheet 12 which is preferably comprised of a resin impregnated paper formed into a honeycomb structure of a dense plurality of contiguous cells (a representative few of which are identified by reference numeral 12a). The individual cells 12a of the honeycomb sheet 12 can have virtually any cross-sectional geometry depending on the desires of the component designer and the resulting performance characteristics that may be required. Thus, the individual cells 12a may have a hexagonal configuration (e.g., as is perhaps more apparent in FIG. 2A) or may have virtually any other typical columnar cross-sectional configuration, such as pentagonal, hexagonal, octagonal, square, rectangular, triangular or other polygonal cross-sectional configurations as may be desired.

One preferred form of the honeycomb sheet 12 includes composite honeycomb sheets formed of fibrous NOMEX® polyaramid paper that is saturated with a phenolic resin and commercially available from a number of sources. Typically the walls of the honeycomb cells in such sheets will range from about 0.05 mm to about 0.25 mm in thickness. The overall height of the honeycomb core 22 can be greater than about 15 mm, for example about 25 mm or greater with widths varying greatly as may be required.

Important to the embodiments disclosed herein, the honeycomb sheet 12 is provided with a curable adhesive film 14 that is adhered (laminated) as a layer onto only one of the opposed major surfaces 12-1, 12-2 of the honeycomb sheet 12 (e.g., the lower surface 12-2 of the honeycomb sheet 12 as shown). The other of the opposed major surfaces (e.g., the upper surface 12-1) remains uncovered and thereby unstabilized by any adherent layer.

Presently preferred for use as the curable adhesive film 14 is a thermally curable (thermosetting) non-reinforced epoxy adhesive film having a nominal pre-cured thickness of between about 0.05 mm to about 0.4 mm, typically about 0.10 mm. and a nominal weight of between about 0.07 kg/m$^2$ to about 0.41 kg/m$^2$, typically about 0.22 kg/m$^2$. The adhesive film 14 is preferably curable at ambient pressure conditions under elevated temperatures of between about 80° C. to about 150° C., preferably about 120° C. One particularly suitable curable adhesive film that may be employed in the practice of the present invention is 3M™ Scotch-Weld™ Structural Adhesive Film AF 163-2.

Figure 3A:
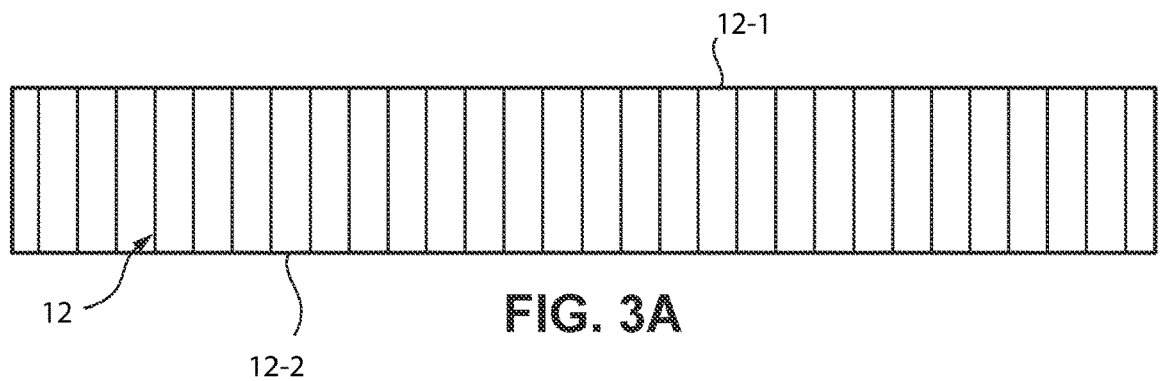
FIGS. 3A-3D are schematic end elevational views of the fabrication steps employed in making the partially stabilized honeycomb core in accordance with an embodiment of this invention.
Figure 3B:
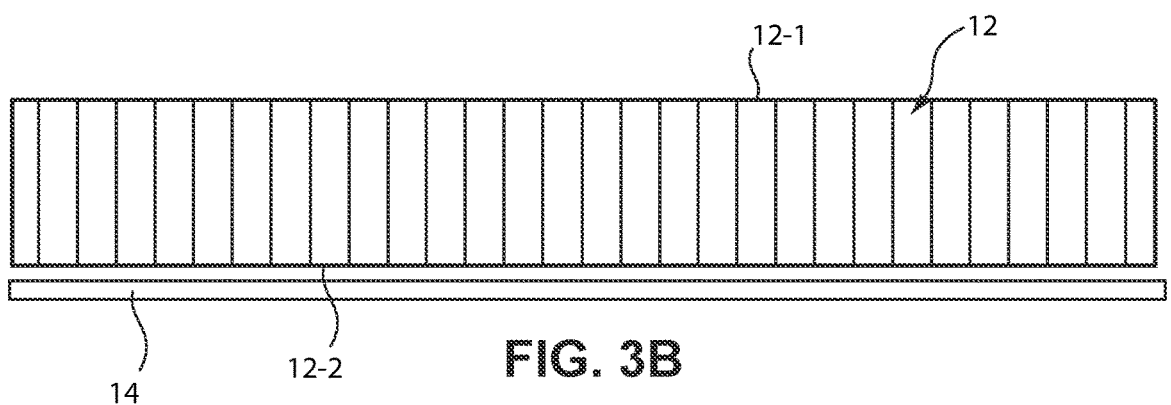

The partially stabilized honeycomb core 10 may be fabricated by initially providing an uncured honeycomb sheet 12 as a preform comprised of the uncured honeycomb sheet 12 as shown in FIG. 3A. Thereafter, the honeycomb sheet 12 may be positioned so that a lower surface 12-2 thereof is positioned over an uncured adhesive film 14 as shown in FIG. 3B so that the uncured adhesive film 14 may be brought into in contact with the surface 12-2 as shown in FIG. 3C.

Figure 3C:
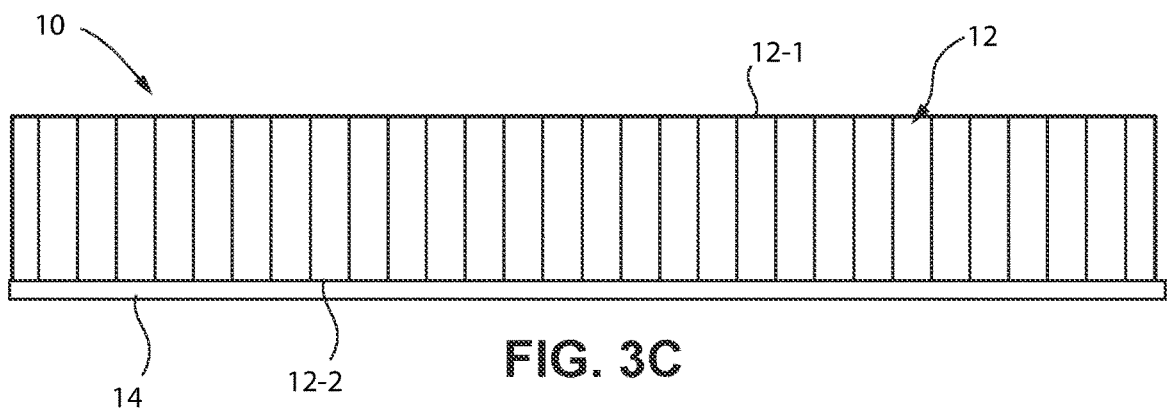
Figure 3D:
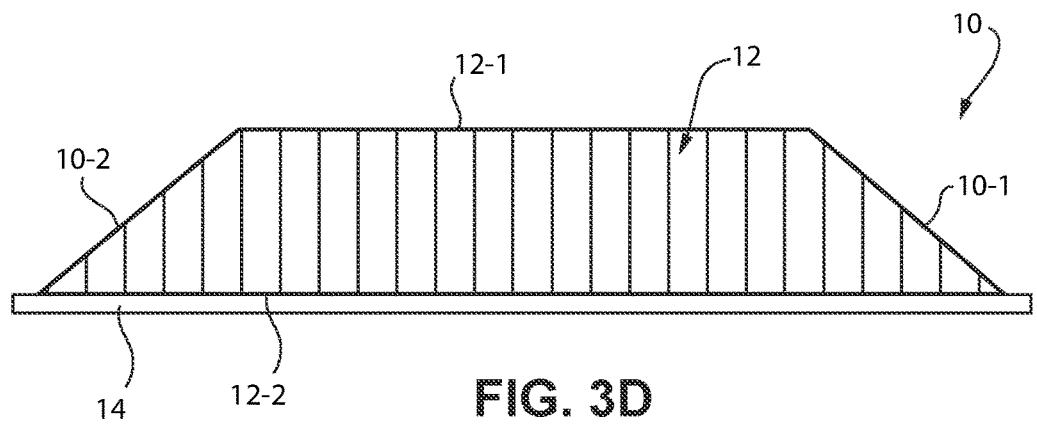

The uncured honeycomb sheet 12 with the uncured adhesive film 14 in contact with the surface 12-2 shown in FIG. 3C may then be subjected to ambient atmospheric (0 psig) curing conditions at elevated temperatures sufficient to cure and adhesively bond the adhesive film 14 to the surface 12-2 of the honeycomb sheet 12. Suitable atmospheric curing temperatures will be dependent upon the particular adhesive film employed but typically range between about 80° C. to about 150° C., preferably about 120° C. (+/−5° C.). After ambient atmospheric curing, the partially stabilized honeycomb core 10 will be formed that is stabilized against compressive forces in the W and L dimensions thereof but is sufficiently flexible to allow bending and/or curvature about the W and/or L axes. The partially stabilized honeycomb core 10 may then be edge chamfered as shown in FIG. 3D to provide for chamfered side edges 10-1 and 10-2. Chamfer angles at the side edges 10-1 and 10-2 may be at least about 15°, 20°, 25° or 30° up to about 85°, typically between about 20° to about 25°.

Figure 4:
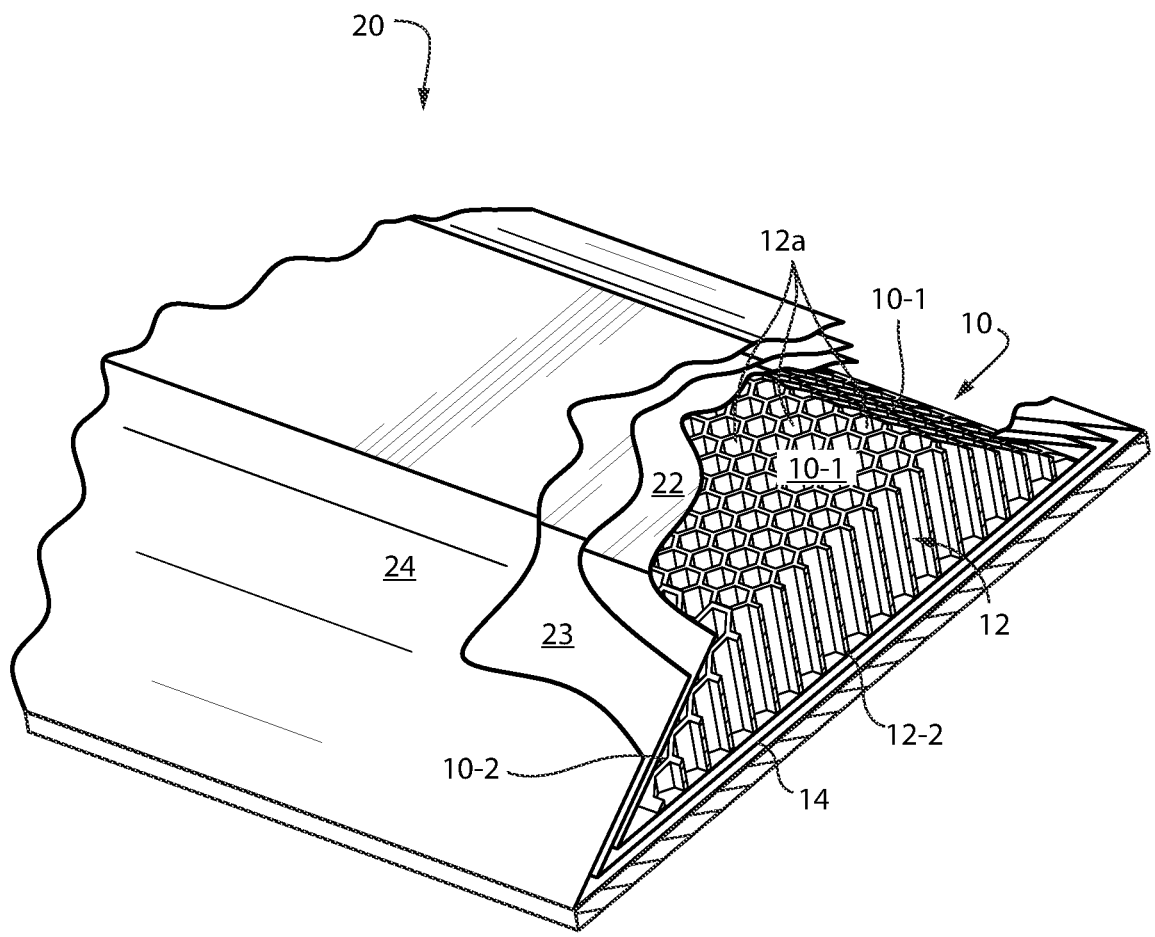
FIG. 4 is a perspective view, partly sectioned, of a pressure-curable fiber-reinforced composite part which employs the partially stabilized honeycomb core as shown in FIG. 1.

Accompanying FIG. 4 schematically depicts a fiber-reinforced composite preform 20 which includes the partially stabilized honeycomb core 10 enveloped on all sides by multiple resin-impregnated fiber-reinforced matrix material plies ("prepreg plies") 22, 23 and 24, respectively, to thereby provide a final product preform of a desired shape that can be subjected to autoclave curing conditions. It will be observed that the prepreg plies 22, 23 and 24 will thus envelope or surround the chamfer sides 10-1, 10-2 as well as the top and bottom surfaces 12-1 and 12-2, respectively. Virtually any reinforcement fibrous material, such as unidirectional or bidirectional fiber mats formed of reinforcement fibers (e.g., carbon, aramid and/or glass fibers) that is resin impregnated may be employed as the prepreg plies 22, 23 and 24.

It will be appreciated that the fiber-reinforced composite preform 20 is depicted as a bar-shaped structure for ease of presentation but that it may be curved and/or bent as desired when laying up the prepreg plies 22, 23 and 24 to thereby form a final fiber-reinforced composite structure of more complex geometry. The fiber-reinforced composite preform 20 will thus be in the final shape and dimension of the finished fiber reinforced composite structure and may then be subjected to a vacuum-bagged high temperature and high pressure (autoclave) curing. In this regard, the fiber-reinforced composite preform 20 may be placed in a vacuum bag with the bagged article thereafter being placed in an autoclave. The temperature employed in the autoclaving step will be sufficiently high so as to cure the prepreg plies 22, 23 and 24 such as from about 100° C. to about 190° C. (+/−10° C.), e.g., between about 120° C. to about 180° C. (+/−10° C.). Similarly, elevated pressures will be employed during autoclaving sufficient to achieve full curing of the prepreg plies 22, 23 and 24. Typically, pressures of from about 20 psi to about 100 psi, e.g., from about 30 psi to about 100 psi, will be employed. All of the parameters associated with the autoclave curing are in and of themselves conventional and will be well known to those skilled in this art depending on the type and/or number of prepreg plies employed in the final product.

Once the autoclave curing is completed, the finished honeycomb core laminate structure may be removed from the form and employed as a part in its as-is condition and/or machined for fabrication of other aircraft related components. In this regard, the process employed by the embodiment described above form a honeycomb core laminate structure that is net final shape. That is, due to the partial stabilization that is provided by way of the ambient pressure cure of the adhesive film 14 to only one surface of the honeycomb sheet 12, the preform 20 can be designed without regard to part shrinkage (e.g., without experiencing honeycomb core collapse). Thus, the partially stabilized honeycomb core 10 can be manipulated into curved or bent configurations as may be required so as to at near net final product shape except for the thickness to be provided by the prepreg layers 22, 23 and 24.

Therefore, while reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A process for making a rigid panel comprised of a cured honeycomb core composite laminate structure, wherein the process comprises:
   (a) forming a honeycomb core preform comprised of a flexible honeycomb sheet and a stabilizing layer comprised of an adhesive film in contact with and covering entirely only one exterior surface of the flexible honeycomb sheet such that an opposite exterior surface of the flexible honeycomb sheet remains uncovered by the adhesive film;
   (b) subjecting the honeycomb core preform formed according to step (a) to ambient atmospheric pressure cure conditions at an elevated temperature sufficient to adhere the adhesive film entirely covering only the one exterior surface to the one exterior surface of the flexible honeycomb sheet while maintaining the opposite exterior surface uncovered and thereby provide a partially stabilized honeycomb core that is partially stabilized against compressive forces exerted in widthwise and lengthwise directions thereof yet allows flexible bending of the partially stabilized honeycomb core about axes in the widthwise and lengthwise directions thereof;
   (c) laying up a plurality of resin-impregnated fiber-reinforced plies which envelope all exterior surfaces of the partially stabilized honeycomb core to form a final panel preform; and
   (d) subjecting the final panel preform to high temperature and high pressure autoclave curing conditions sufficient to cure the plurality of resin-impregnated fiber-reinforced plies and provide the rigid panel comprised of the cured honeycomb core composite laminate structure.

2. The process according to claim 1, wherein step (b) further comprises a step of (b1) chamfering side edges of the partially stabilized honeycomb core.

3. The process according to claim 2, wherein step (b1) comprises chamfering the side edges of the partially stabilized honeycomb core to achieve chamfer angles of between about 15° to about 85°.

4. The process according to claim 1, wherein step (d) comprises placing the final panel preform in a vacuum bag and applying a vacuum to the vacuum bag during the autoclave curing conditions.

5. The process according to claim 4, wherein the high temperature employed in step (d) is between about 100° C. to about 190° C.

6. The process according to claim 5, wherein the high pressure employed in step (d) is between about 20 psi to about 100 psi.

7. The process according to claim 1, wherein the ambient atmospheric pressure condition of step (b) is 0 psig.

8. The process according to claim 7, wherein step (b) is practiced at an elevated temperature of between about 80° C. to about 150° C.

9. The process according to claim 1, further comprising, prior to step (c), a step of bending the partially stabilized honeycomb core to form at least one curvature therein.

10. The process according to claim 1, wherein the plurality of resin-impregnated fiber-reinforced plies comprise epoxy resin-impregnated unidirectional or bidirectional carbon fiber mats.

11. The process according to claim 1, wherein the flexible honeycomb sheet includes a plurality of contiguous cells having a columnar cross-sectional configuration.

12. The process according to claim 11, wherein the plurality of cells have a pentagonal, hexagonal, octagonal, square, rectangular or triangular cross-sectional configuration.

13. The process according to claim 11, wherein the flexible honeycomb sheet comprises a resin impregnated paper defining the plurality of contiguous cells.

14. A process for making a partially stabilized flexible honeycomb core comprising the steps of:
   (a) providing a flexible honeycomb sheet and an adhesive film;
   (b) forming a honeycomb core preform by positioning the adhesive film onto only one exterior surface of the flexible honeycomb sheet such that the adhesive film entirely covers only the one exterior surface while an opposite exterior surface of the flexible honeycomb sheet remains uncovered; and (c) forming the partially stabilized flexible honeycomb core from the honeycomb core preform by adhering the adhesive film to only the one exterior surface of the honeycomb sheet to thereby form a stabilizing layer on only the one exterior surface of the flexible honeycomb sheet, wherein step (c) comprises subjecting the honeycomb core preform to atmospheric pressure cure conditions at an elevated temperature while maintaining the opposite exterior surface uncovered to thereby form the partially stabilized flexible honeycomb core that is partially stabilized against compressive forces exerted in widthwise and lengthwise directions thereof yet allows flexible bending of the partially stabilized flexible honeycomb core about axes in widthwise and lengthwise directions thereof.

15. The process according to claim 14, which further comprises:

(d) chamfering side edges of the partially stabilized honeycomb core.

16. The process according to claim 15, wherein step (d) comprises chamfering the side edges of the partially stabilized honeycomb core to achieve chamfer angles of between about 15° to about 85°.

17. A process for making a cured curved rigid honeycomb core composite laminate structure comprising:

(a) forming a honeycomb core preform comprised of a flexible honeycomb sheet and a stabilizing layer comprised of an adhesive film in contact with and covering entirely only one exterior surface of the flexible honeycomb sheet such that an opposite exterior surface of the flexible honeycomb sheet remains uncovered by the adhesive film;

(b) subjecting the honeycomb core preform formed according to step (a) to ambient atmospheric pressure cure conditions at an elevated temperature sufficient to adhere the adhesive film entirely covering only the one exterior surface to the one exterior surface of the flexible honeycomb sheet and thereby provide a partially stabilized honeycomb core that is partially stabilized against compressive forces exerted in widthwise and lengthwise directions thereof yet allows flexible bending of the partially stabilized honeycomb core about axes in the widthwise and lengthwise directions thereof;

(c) manipulating the partially stabilized honeycomb core about at least one of the widthwise and lengthwise directions thereof to form at least one curvature and thereby achieve a near net final curved product shape of the partially stabilized honeycomb core;

(d) laying up a plurality of resin-impregnated fiber-reinforced plies which envelope all exterior surfaces of the partially stabilized honeycomb core while in the near net final curved product shape thereof to form a final curved product preform; and (e) subjecting the final curved product preform to high temperature and high pressure autoclave curing conditions sufficient to cure the plurality of resin-impregnated fiber-reinforced plies and provide the cured curved rigid honeycomb core composite laminate structure.

18. The process according to claim 17, wherein step (b) further comprises a step of (b1) chamfering side edges of the partially stabilized honeycomb core.

19. The process according to claim 18, wherein step (b1) comprises chamfering the side edges of the partially stabilized honeycomb core to achieve chamfer angles of between about 15° to about 85°.

20. The process according to claim 17, wherein step (e) comprises placing the final curved product preform in a vacuum bag and applying a vacuum to the vacuum bag during the autoclave curing conditions.

21. The process according to claim 20, wherein the high temperature employed in step (e) is between about 100° C. to about 190° C.

22. The process according to claim 21, wherein the high pressure employed in step (e) is between about 20 psi to about 100 psi.

23. The process according to claim 17, wherein the ambient atmospheric pressure condition of step (b) is 0 psig.

24. The process according to claim 23, wherein step (b) is practiced at an elevated temperature of between about 80° C. to about 150° C.

25. The process according to claim 17, wherein the plurality of resin-impregnated fiber-reinforced plies comprise epoxy resin-impregnated unidirectional or bidirectional carbon fiber mats.

26. The process according to claim 17, wherein the honeycomb sheet includes a plurality of contiguous cells having a columnar cross-sectional configuration.

27. The process according to claim 26, wherein the plurality of cells have a pentagonal, hexagonal, octagonal, square, rectangular or triangular cross-sectional configuration.

28. The process according to claim 26, wherein the flexible honeycomb sheet comprises a resin impregnated paper defining the plurality of contiguous cells.

* * * * *